Patented Oct. 10, 1950

2,525,079

UNITED STATES PATENT OFFICE 2,525,079

CLEANING PREPARATION FOR REMOVING SILICONE RESINS FROM BAKING PANS AND SIMILAR ARTICLES

Wendell Reeder and John J. Russ, Dallas, Tex., assignors to Campbell Taggart Research Corporation, Dallas, Tex., a corporation of Missouri No Drawing. Application December 15, 1948, Serial No. 65,533

4 Claims. (Cl. 252—135)

This invention relates to a cleaning preparation for removing silicone resins from baking pans and similar articles, and particularly multiple coatings.

For example, it has recently become the practice to coat surfaces of baking pans with silicone resins in the place of grease to prevent sticking and facilitate removal of the contents after baking. When silicone resins are applied in a very thin film on the inner surfaces of the pans with the use of a volatile solvent and the coating heat cured, the treated pans may be used repeatedly without greasing them. The silicone resin type of coating also has other advantages such as cleanliness and improved appearance of the pans.

After the pans have been baked in for approximately 100 bakes, bread tends to stick in the pans and it becomes necessary to reglaze the pans over the previous coating which is also heat cured. The retreated pans may then be used for an additional number of bakes but experience has shown that after three or four coatings have been applied to the pans, it is necessary to remove all of the silicone resin and start over with a new coating.

Removal of multiple coatings of silicone resin has presented many problems due to insolubility of silicone resins in water, organic solvents or acids. Many ordinary pan cleaners previously used in the baking industry are not effective. Other of the pan cleaners which contain strong alkalies have been found to remove the silicone resins at elevated temperatures and long boiling periods but the alkalies destroy the tin and tin oxide surface of the bread pans causing spangling of the tin which interferes with proper baking of the bread and ultimately the entire tin-tin oxide coating is removed, so that the pans must be discarded.

Therefore, the principal object of the present invention is to provide a cleaner which effectively removes multiple coats of a silicone resin in a relatively short time and without spangling or in any way affecting the metallic coatings such as tin, tin oxide or the like necessary in protecting metal surfaces.

A solution of the problem has proved difficult because silicone resins are new compounds in the bakery industry and their reactions cannot be predicted. Thus, removal of the coatings or pan glaze made by heat curing of silicone resins is new in the baking industries, especially when the removal is accomplished without attacking the tin-tin oxide surface of the pans.

While certain strong cleaners will remove a single silicone resin coating, they have no effect on multiple coatings. Moreover, as the number of coatings of silicone resins are accumulated, the removal becomes more and more difficult.

We have found that a mixture of sodium metasilicate (commonly known as Metso), sodium carbonate (light soda ash), and borax in the proper proportions when added to water forms an effective solution capable of removing multiple silicone coatings without damage to the tin-tin oxide surface of bread pans.

The best proportions of the cleaner ingredients are sodium metasilicate, 45%; sodium carbonate, 32%; and borax, 23%. It has been found that these proportions can be varied only as follows: sodium metasilicate, 35 to 55%; sodium carbonate, 22 to 42%; and borax, 18 to 28%.

In using the cleaner, a solution is prepared by using from 6 to 12 ounces of the mixture per gallon of water. The glazed pans having multiple layers of coatings are placed in the solution and the solution boiled a sufficient time to remove the coating, usually from 6 to 8 hours.

After thus cleaning the pans, they are completely free of the silicone resins, the tin-tin oxide surface is intact and free from spangling with the result that the tin-tin oxide surface of the pans has not been disturbed.

Experiments have shown that no two of the above-mentioned chemicals are satisfactory in themselves and the cleaner requires all three ingredients to effectively remove the silicone resins.

The cleanser composition can be used without a detinning inhibitor of any kind, although one may be added if desired although we have found that no inhibitor is necessary.

Having described our invention, what we claim and desire to secure by Letters Patent is:

1. A composition for removing multiple coatings of heat treated silicone resins from tin-tin oxide covered surfaces consisting of 35 to 55% sodium metasilicate, 22 to 42% soda ash, and 18 to 28% borax.

2. A composition for removing multiple coatings of heat treated silicone resins from tin-tin oxide covered surfaces in a solution of said composition consisting of 35 to 55% sodium metasilicate, 22 to 42% soda ash, and 18 to 28% borax in concentration of six to twelve ounces of the composition per gallon of water.

3. A composition for removing multiple coatings of silicone resins from tin-tin oxide covered metal surfaces without effecting the tin-tin oxide in an aqueous solution of said composition consisting of 45% sodium metasilicate, 32% sodium carbonate, and 23% borax in concentration of six to twelve ounces of the composition per gallon of water.

4. A composition for removing multiple coatings of heat treated silicone resins from tin-tin oxide covered surfaces, consisting of 45% sodium metasilicate, 32% sodium carbonate, and 23% borax.

WENDELL REEDER.
JOHN J. RUSS.

REFERENCES CITED

The following references are of record in the file of this patent:

UNITED STATES PATENTS

| Number | Name | Date |
|---|---|---|
| 2,155,046 | Griffith et al. | Apr. 18, 1939 |
| 2,350,592 | Comaschi | June 6, 1944 |
| 2,365,215 | Rhodes | Dec. 16, 1944 |